United States Patent [19]

Henley

[11] Patent Number: 4,874,203

[45] Date of Patent: Oct. 17, 1989

[54] VEHICLE PASSENGER SEAT FOR HANDICAPPED PERSONS

[76] Inventor: Alvera S. Henley, Rte. 23, Box 398, Newland, N.C. 28657

[21] Appl. No.: 164,890

[22] Filed: Mar. 7, 1988

Related U.S. Application Data

[63] Continuation-in-part of Ser. No. 892,708, Aug. 1, 1986, abandoned, which is a continuation-in-part of Ser. No. 748,018, Jun. 24, 1985, abandoned.

[51] Int. Cl.⁴ .................. A47C 15/00; A61G 5/00
[52] U.S. Cl. .................. 297/250; 5/81 R; 297/231; 297/464; 297/435; 297/DIG. 4
[58] Field of Search ............. 297/232, 250, 253-256, 297/302, 464, 485, DIG. 4; 5/81 R, 81 B

[56] References Cited

U.S. PATENT DOCUMENTS

| 260,867 | 7/1882 | Heinig | 297/254 |
|---|---|---|---|
| 1,580,522 | 4/1926 | Murray | 297/457 X |
| 2,255,823 | 3/1981 | Boyer et al. | 5/81 R |
| 2,308,315 | 1/1943 | Smith | 297/250 |
| 3,917,312 | 11/1975 | Rodaway | 297/DIG. 4 X |
| 4,229,039 | 10/1980 | Day | 297/232 |
| 4,613,188 | 9/1986 | Tsuge et al. | 297/250 |
| 4,688,849 | 8/1987 | Tsuge et al. | 297/250 |
| 4,728,119 | 3/1988 | Sigafoo | 297/485 |

FOREIGN PATENT DOCUMENTS

| 863688 | 2/1971 | Canada | 297/253 |
|---|---|---|---|
| 2001415 | 11/1971 | Fed. Rep. of Germany | 297/464 |
| 815007 | 6/1959 | United Kingdom | 297/353 |
| 1182752 | 3/1970 | United Kingdom | 297/250 |

Primary Examiner—Peter R. Brown
Attorney, Agent, or Firm—Rhodes, Coats & Bennett

[57] ABSTRACT

A vehicle passenger safety seat for handicapped persons is designed for positioning and detachably mounting over the existing conventional seat on a bus, van, or other such vehicle. The supporting frame of the safety seat is constructed from a perforated sheet of aluminum material bent into a configuration having a seat and vertical back. A pair of retractable straps are attached to the upper portion of the seat back, which straps are lapped over the top of and downwardly behind the vehicles seat where the straps are latched to the floor of the vehicle to prevent forward tilting of the safety seat. A second retractable strap is attached to the rear of the foot rest and extends under the vehicle seat to the floor latch. Overlying the tubular aluminum frame is a cushioned seat. Arm rests attached to the frame are pivotally mounted for ease in placing the handicapped person into the seat. An optional head rest supports the head of the passenger and a foot support attached to the front of the seat supports the feet of the passenger. A shoulder harness and lap belt are provided for support of the passenger in the seat during travel. A wheeled dolly which removably receives the safety seat is provided for transport of the handicapped person in the seat from the vehicle to another site.

3 Claims, 7 Drawing Sheets

VEHICLE PASSENGER SEAT FOR HANDICAPPED PERSONS

This application is a continuation-in-part of applicant's previous continuation-in-part application, Ser. No. 892,708, filed Aug. 1, 1986, now abandoned; which was a continuation-in-part of Ser. No. 748,018 filed June 24, 1985 and now abandoned.

BACKGROUND AND SUMMARY OF PRESENT INVENTION

With the increased awareness of the need to protect handicapped passengers during travel, research has determined that most of the available seats and wheelchairs for use in transporting passengers in busses, van, and other similar types of vehicles have been modified during recent years to accomodate the transportation of handicapped people, particularly those who are confined to wheelchairs. However, it has been proven that the safety of passengers traveling in wheelchairs or conventional bus seats is significantly endangered. One approach to lessening the danger has been the modification of the floor of such vehicles and/or the vehicle seat frames to receive wheelchairs and/or means for locking the wheelchairs into a generally immobile position.

Another approach has been the provision of a safety seat much like those used in automobiles to seat small children. However, these seats are primarily useful for infants and very small children and have not been well designed for use by adults or large children.

Attempts at locking down wheelchairs on busses and vans have also proved unsatisfactory for a variety of reasons. One of the primary reasons is that it is relatively easy for a wheelchair to become unlocked and to begin rolling. Additionally, wheelchairs themselves are bulky and substantially reduce the number of passengers that can be carried in one vehicle. Other modifications made either to the vehicle seats or to the wheelchairs are dangerous in that ultimately the changes reduce the crashworthiness of the seat.

It is generally accepted that prevention of serious and death in motor vehicle accidents is most effectively achieved by preventing the "second impact"—or human collision; i.e., the occupant striking the vehicle interior. Prevention of this second, human collision requires that the wheelchair itself be secured independently of the occupant. Such a requirement is complicated by the fact that wheelchairs are not designed for use as a vehicle seat and therefore not constructed with the intent to survive vehicle collisions.

Because of such problems the National Highway Traffic Safety Administration (NHTSA) has stated that although authorities are aware of the problems involved in transporting handicapped people, there has been very little progress made toward resolving the problem. Federal and state laws will, in the near future, require provision of minimal safety devices on vehicles transporting children or handicapped persons. While it may be relatively easy to meet the safety needs of those children and adults who are not handicapped, the transportation of handicapped persons will remain a primary concern for parents and others who must be continuously involved.

It is toward the resolution of some of these problems and disadvantages with the existing art that the present inventor is working. The present invention comprises a seat for handicapped persons which seat can be mounted securely but detachably over the existing conventional seat in a bus or van. The seat itself includes a frame constructed of an aluminum material which supports an overlying cushioned seat. The preferred embodiment of the seat frame includes a pair of retractable straps or, in an alternate embodiment, brackets which fit over the top and behind the existing vehicle seat to prevent forward tilting of the handicapped safety seat. The seat frame is basically of a configuration defining the conventional shape of a seat, a back, and the above-described straps or brackets. A sheet of perforated aluminum is formed into the basic seat and back and supports a foam cushion thereover. Alternate embodiments of the frame include a plurality of interrelated side and crossbars with associated braces for strength; or a plurality of horizontal bars extending between the side rails. A foam cushion overlies these embodiments as in the preferred. Arm rests are pivotally attached to the frame or to the side rails of the frame and may be pivoted outwardly and upwardly to provide clear access for moving the person from a wheelchair into the passenger safety seat. When the passenger is in place the arm rests are tilted downwardly to a normal position on either side of the person. A foot support extending downwardly from the front of the seat portion of the passenger safety seat supports the feet of the passenger. If desired or necessary, an optional head rest may be attached to the back frame to support the head of the passenger and minimize any likelihood of injury due to a sudden impact which might cause a whiplash or other such injury to the neck or head. The head rest, arm rests, and foot support all include adjustable straps to retain the patient's extremities in or on the respective support.

In the preferred embodiment, the means for securing the safety seat over the conventional vehicle seat includes two pairs of retractable straps which buckle to the floor of the bus or van. The first pair of straps, which form a first retaining means are attached to the upper front surface of the back of the safety seat — one strap on either side — and are coiled such that the straps may be extended from the safety seat back over and downwardly behind the vehicle seat to a floor-mounted latch or clasp. The second pair of straps forming a second retaining means are retractably mounted on the rearward facing surface of the foot support, such that the straps, when uncoiled, extend backwardly under the vehicle seat to the aforementioned floor-mounted clasp. Each of the straps includes a stop mechanism associated with the coil or winding control to prevent loosening of the strap after the seat is secured in place. An alternate embodiment of the second retaining means includes a belt or strap that is attached at one end to the floor of the vehicle by a buckle, is looped over the safety seat at the juncture of seat and back, and fastened at the opposite end to the floor of the vehicle. A second alternative of the second retaining means includes means whereby the seat strap is attached first to the seat frame of the bus or vehicle, and extended over the safety seat (under the overlying cushioned seat) to fasten to the opposite side of the vehicle seat frame. In this second alternative the strap or belt includes a plurality of adjustment slots or loops which are engaged by a wing-nut and long U-bolt to attach the belt to the bus frame. The aforementioned upper straps or brackets which extend from the back portion of the seat frame for mounting over the top and behind the bus seat further secure the safety seat and prevent it from tilting forwardly.

Because of the ease in fastening or unfastening any of the straps in either embodiment, the present invention may be quickly and efficiently mounted on or removed from the vehicle seat. It is thereby obvious that the present invention allows the safe seating and transportation of handicapped people without requiring permanent modification of the conventional seats in a bus or other vehicle. It should also be obvious that one or more of these safety seats could be provided for use on school busses, city transportation, or other types of vehicles which are not dedicated primarily to transportation of the handicapped.

The objectives of the present invention therefore include the provision of a means for the safe transportation of handicapped persons. A further objective is the provision of such transportation through means of a safety seat which may be easily and detachably mounted over the existing conventional seat of a bus or other such vehicle. Another objective is the provision of a safety seat for transporting handicapped persons and including means for restraining the passenger as necessary; specifically providing head, arm/wrist, and foot-restraining means. Other and further modifications of the present invention will become apparent when studying the following detailed description of a preferred embodiment in conjunction with the accompanying drawings.

In the drawings

DETAILED DESCRIPTION OF PREFERRED EMBODIMENT

Figure 1:
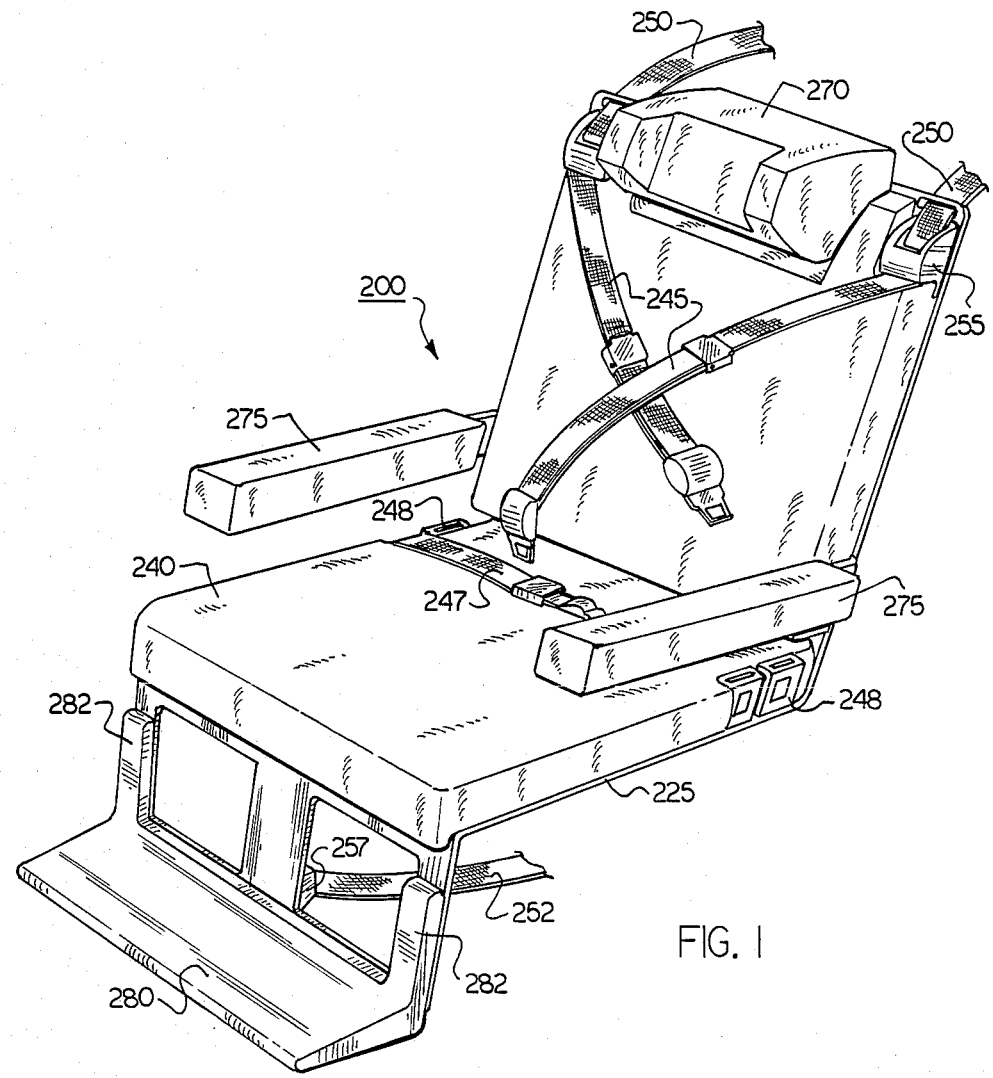
FIG. 1 is a perspective view of the safety seat according to a preferred embodiment.
Figure 2:
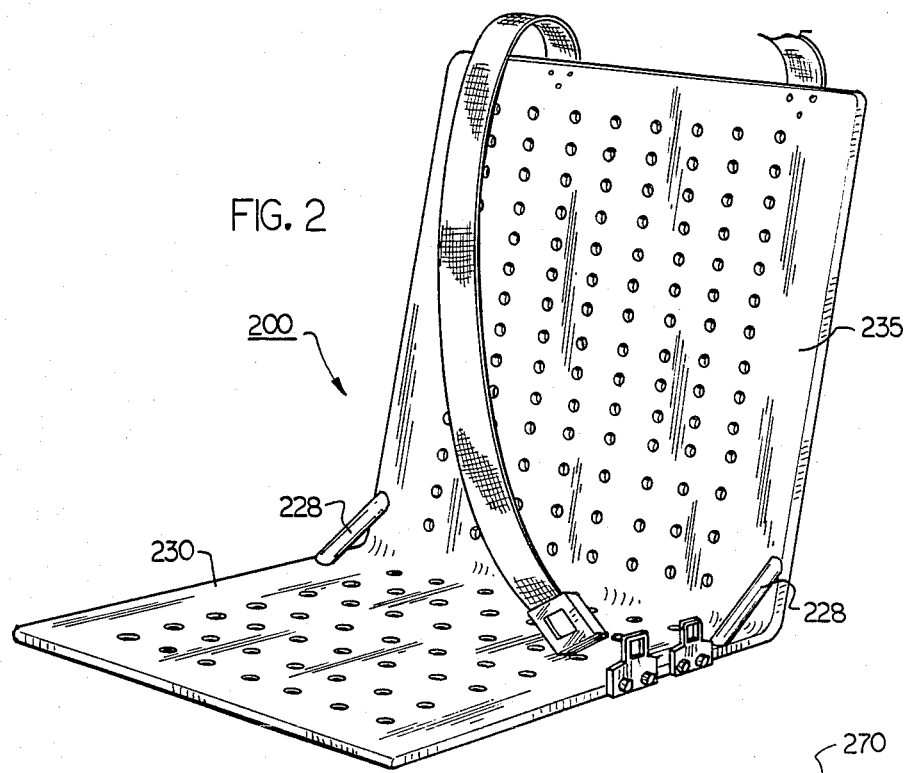
FIG. 2 is a perspective view of the safety seat shown in FIG. 1 with the cushion removed to reveal the underlying frame.
Figure 3:
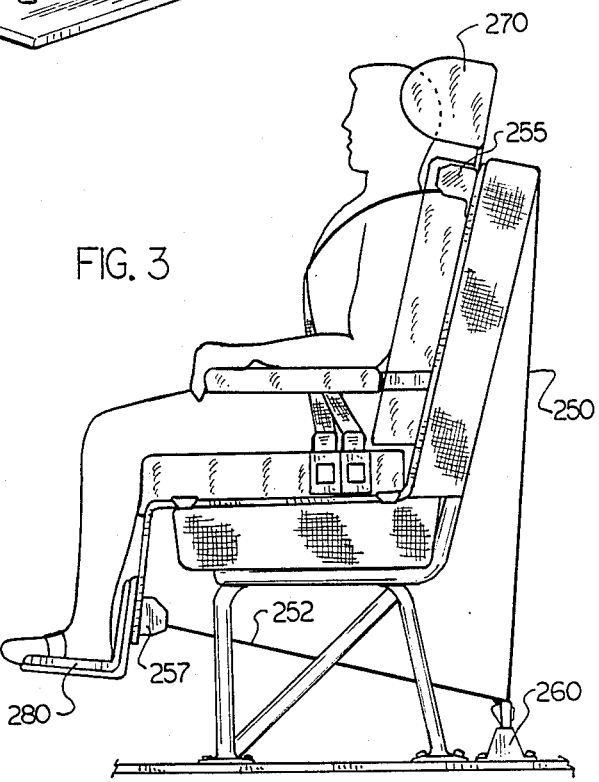
FIG. 3 is a view taken from the side of the vehicle seat illustrating the means for attaching the seat of FIGS. 1 and 2 to the frame of the conventional vehicle seat.

Looking first at FIGS. 1 and 2, the safety seat 200 includes a base supporting frame 225 which has a seat portion 230 and a vertical back portion 235. A resilient seat 240 overlies the seat and back for cushioning. A three-point harness-type safety belt having chest straps 245 and lap strap 247 are attached to the frame 225 and extend across the chest and lap of the occupant to fasten in latches 248 on either side of the frame.

The underlying support frame is preferably aluminum sheet stock which is formed into the appropriate configuration by conventional metal working procedures. Perforations 226 reduce the weight of the frame without compromising the strength of the seat. Braces 228 are bolted or welded between the seat and back portions of the frame to reduce the likelihood of warping or collapse during collisions or other accidents.

The overlying seat member 240 is either an upholstered foam cushion or a molded polymeric material having some cushioning characteristics.

The complete seat 200 is secured over the vehicle seat by means of a plurality of retractable straps 250 and 252 which are retractably coiled into housings 255 and 257 respectively at the upper back and behind the footrest. The seat 200 is properly positioned on the vehicle seat and straps 250 are pulled downwardly behind the vehicle seat to a floor-mounted latch 260. The strap 252 is pulled from behind the footrest and extended underneath the vehicle seat to also fasten in latch means 260. Each of the straps 250, 252 include coil locking means which prevent loosening or lengthening after the straps are once secured into latch means 260. Arm rests 275 are pivotable to make positioning of the occupant easier, as described below in the discussion of FIG. 8.

Figure 7:
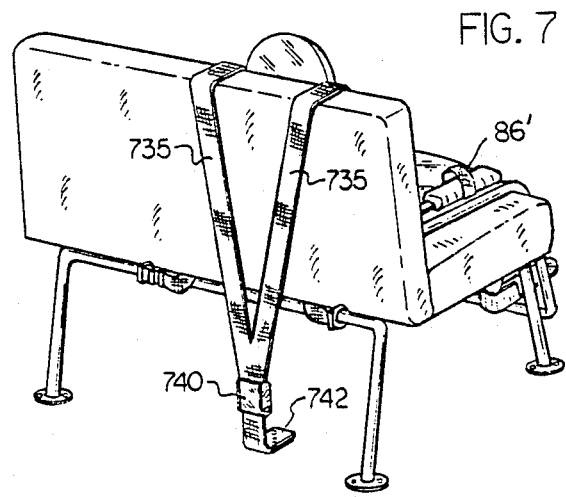
FIG. 7 is a view taken from the rear of the vehicle seat illustrating alternate means for attaching the seat to the frame of the conventional vehicle seat.
Figure 8:
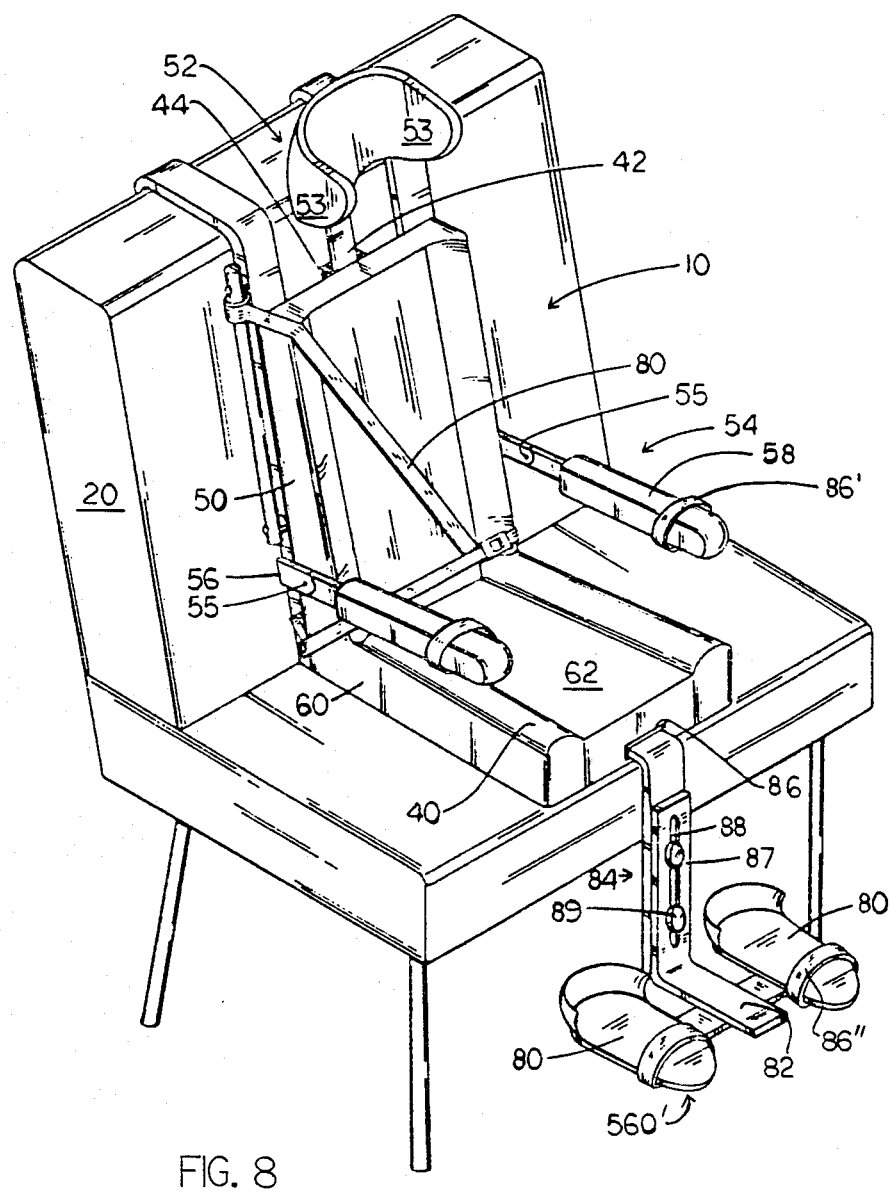
FIGS. 8-11 are views of a second alternate embodiment and elements thereof.

The head rest 270 and foot rest 280 are vertically adjustable, and removable, by conventional means to accommodate occupant of varying size or need. Two approaches to conventional adjustment means are detailed in the discussions of FIGS. 5-8. The preferred footrest and headrest, 280 and 270 are attached and adjusted substantially as shown in FIG. 8.

Alternate Embodiments

Figure 5:
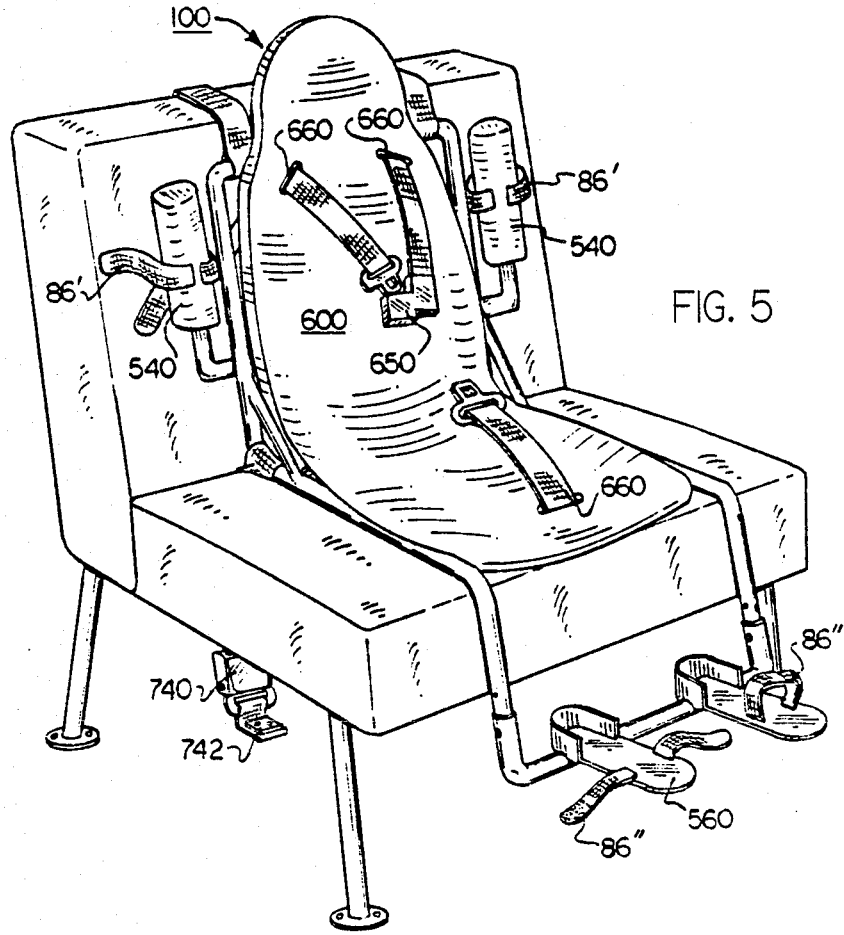
FIG. 5 is a perspective view of the safety seat according to an alternate embodiment.

In FIG. 5 the safety seat 100 is mounted on an existing conventional bus or vehicle seat 20. The seat 100 includes a tubular aluminum supporting frame 300 having a seat portion 400 and a vertical back portion 500. An extruded polymeric seat 600 is attached securely to frame 300. A harness-type seat belt 650 extends through the polymeric seat 600 at slots 660, from attachment points (not shown) on the underlying frame 300. The arm rests 540, and the removable foot support means 560 include restraining straps 86' and 86" respectively. When the handicapped person is properly positioned in the seat, the harness should always be fastened across the person. The arm and foot restraints may be used as desired or as necessary for the safety of the passenger.

Positioning of the passenger in the seat 100 is also made more convenient by the movable arm rests 540 which are backwardly movable by rotation of the tubular bar 555 on which the arm rests are mounted. The tubular bar 555 is mounted rotatably in a second tubular member 520 extending across the back frame 500. The bar 555 may be a continuous piece from the arm rest to the elbow 556 to the telescopic mounting in 520, whereby both arm rests 540 are rotated backwardly in one movement. Alternatively, bars 555 may be separate elbow members telescopically mounted in each end of bar 520. So mounted, the arm rests 540 are separately adjustable.

The underlying support frame 300 is aluminum and comprised of side rail 320 and a plurality of intersecting crossmembers or bars 340. Side rails 320 are formed into a configuration which defines the seat and back portions 400, 500. A brace member 350 extends between the seat and back portions for increased strength. The brace 350 is bolted or welded to both the seat and back frames and reduces the likelihood of the frame warping or collapsing during a collision.

The overlying seat member 600 is preferably a molded polymeric material having some cushioning properties, but primarily chosen for firm support and strength on impact. The seat member 600 is attached to the frame 300 by conventional means (not shown) and the harness 650 pulled through slots 660. The ends of the harness 650 (not shown) are attached to the underlying frame 300 by conventional means such a sewing, etc. An overlying upholstery covering for seat 600 may be formed thereon during molding or may be added after molding as desired.

The seat 100 is secured to the permanent vehicle seat by means of a plurality of straps. A first strap 73 fastens across the frame 300 or 30 at the juncture of the seat and back portions. This strap 73 is fastened to the permanent seat frame by buckles or by loops and bolts as detailed in FIGS. 6 and 7.

A pair of straps 735 are attached to the uppermost cross bar 320 of the frame as best shown in FIG. 2. The straps 735 connect together at their terminal ends by one portion 740 of a buckle; the latch portion of the buckle, 742, being securely attached to the floor of the vehicle. The straps 735 are looped around the back of the vehicle seat 20 and buckled to the floor as shown in FIGS. 5 and 7. Thus strapped to the permanent vehicle seat, the handicapped passenger seat 100 is secure against collision. The alternative embodiment described below utilizes a pair of brackets 36 rather than the preferred straps 735.

Figure 4:
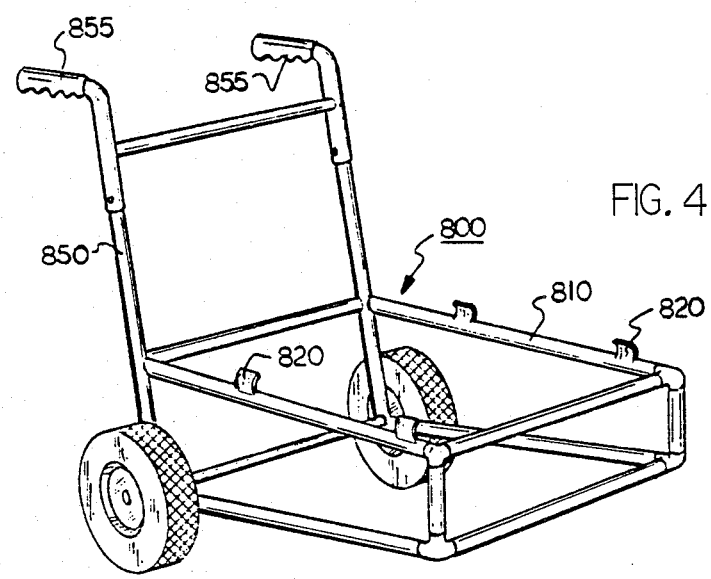
FIG. 4 is a perspective view of a preferred embodiment of a dolly utilized to transport the seat and passenger location to another.

Looking next at FIG. 4, a preferred means of moving the seats 100 and 200 and a passenger therein, is illustrated. The dolly or mobile seat support 800 is comprised of a tubular aluminum frame having a seat receiving frame 810 on which seat 100 or 200 is supported. The seat is secured to the frame 810 by a plurality of compression clips 820 placed around the perimeter thereof. The clips 820 receive side rails 320 of the seat therein. An upright portion 850 includes hand grips 855 mounted thereon for gripping and pushing the dolly much as one would guide a wheelchair.

Figure 6:
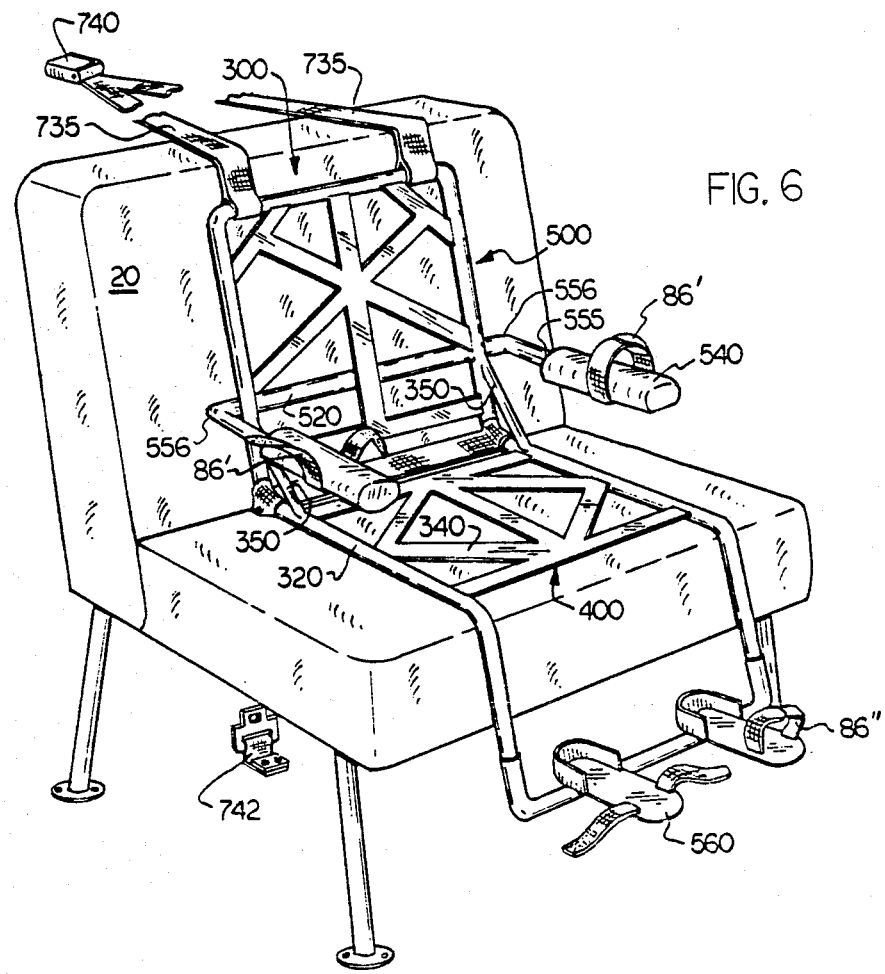
FIG. 6 is a perspective view of the safety seat shown in FIG. 5, with the cushion removed to reveal the underlying tubular frame.
Figure 9:
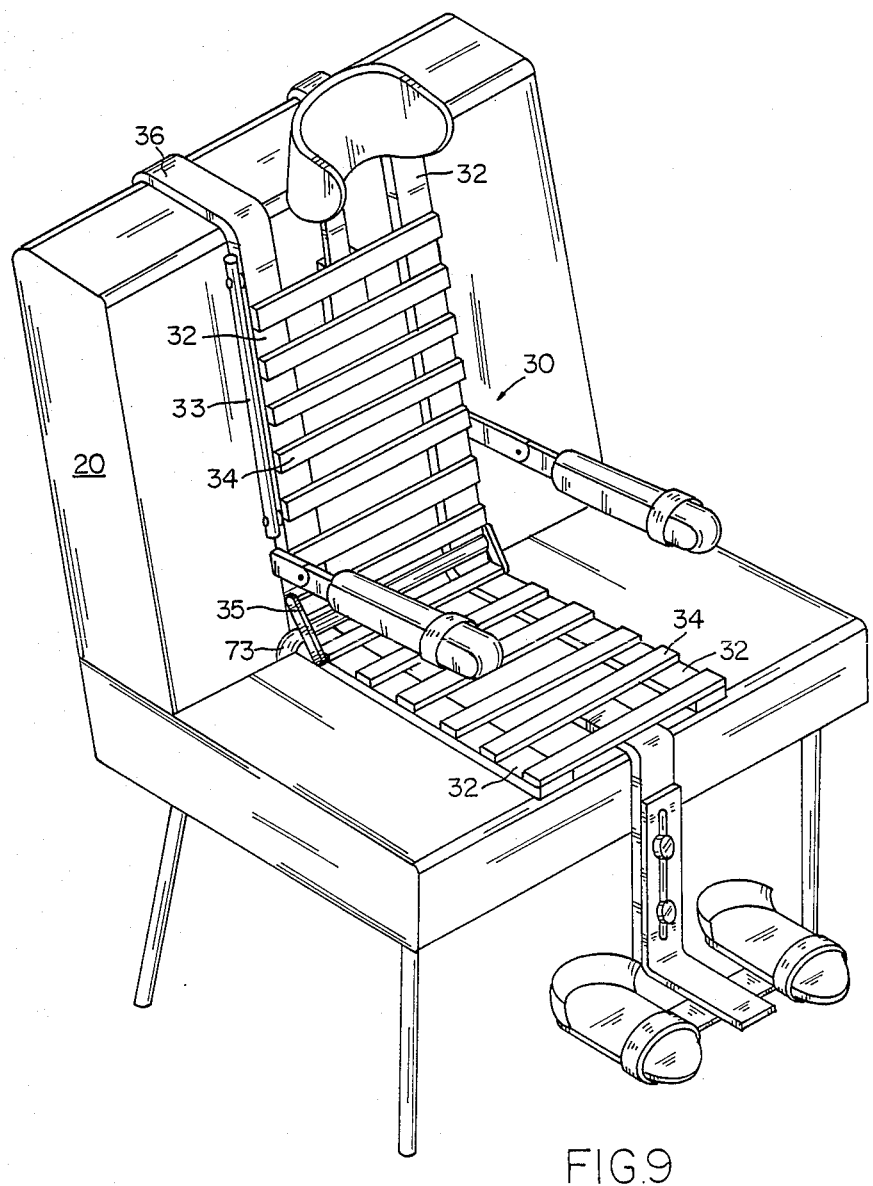

Looking at FIGS. 8 and 9, the second alternative safety seat 10 is shown as being mounted detachably on an existing conventional bus or other vehicle seat 20. The safety seat 10 includes a base supporting frame 30 having a seat portion 40 and a vertical back portion 50, with an overlying foam or otherwise padded cushion 60. A means 70 for attaching the safety seat 10 to the bus seat 20 is shown in FIGS. 6 and 7. A safety belt 80 is attached to a steel rod 33 which is attached to and spaced slightly apart from the side of the back portion 50. The arm rest 54, and the foot support means 56 include retaining straps 86', and 86'' respectively.

The positioning of the passenger in this seat 10 is made more efficient by the fact that the arm rests 54 are pivotally constructed to pivot upwardly and backwardly out of the way to allow the person to be moved from a wheelchair into the seat 10. The pivot means comprises a pivot pin or device 55 that may be pivotally operatively mounted on the side rail to the seat frame or, as shown, between a horizontal extension 56 which is connected to the arm rests 54 by means of the pivoting device 55. The device 55, is of a conventional type which may be selected from the group of means including pivot pins, spring-mounted hinges, and the like.

The underlying supporting frame 30 is generally comprised of side rails 32 and a plurality of overlying horizontal bars 34. The side rails 32 are bent into a configuration which defines the basic seat portion 40 and back 50. An extension of each side rail 32 forms a bracket 36 having a basic U-shape and which brackets are mounted over the top of the conventional bus seat 20. A brace member 35 is bolted or welded between the seat and back portion for increased strength. The side rails, the intersecting or overlying horizontal bars, and the braces and brackets are all preferably formed from a heavy gauge aluminum material. However, it is anticipated that in some embodiments either of the frames might be constructed of hardwoods or some of the heavy-duty, solid polymeric materials.

The overlying padded cushion 60 is formed in a preferred embodiment of a relatively firm foam material cut from slab stock. A decorative covering or upholstery layer 62 covers the foam stock 60. The upholstery material 62 may, of course, be chosen of a wide variety of durable and easily cleaned fabric or synthetic leather. The arm rests 54 also include a padded and upholstered portion 58 over the top surface thereof.

The optional head rest or head support 52 is basically formed of a foam material and upholstered in the same fabric or synthetic leather as the seat cushion. The head support 52 is mounted on a support rod 42 which is welded or otherwise securely attached to the back of the head rest, and which is removably engaged in a track 44 on the rear of the seat back 50. The head support is vertically adjustable by moving upwardly or downwardly in the track 44, and is held in place by compression screws.

The foot support means 560', as shown in FIG. 8, is comprised of a pair of foot rests 80, with attached retaining straps 86''. The foot rests 80 are mounted on a bracket 82 which has a vertical member 84 that is optionally engaged in the seat by means of a channel 86. The vertical portion 84 is a two-piece construction having a vertical adjustment means. The bracket 82 is integral to a vertical support 87 that includes an elongated aperture 88 therein for mounting over a plurality of compression screws 89. To adjust vertically, the screws 89 are loosened and the support 87 moved upwardly or downwardly as appropriate. The screws are then tightened to hold the bracket in position. The embodiment of FIG. 1 includes a bilateral arrangement of these elongated apertures and compression screws supportive of each side 282 of the footrest.

Figure 10:
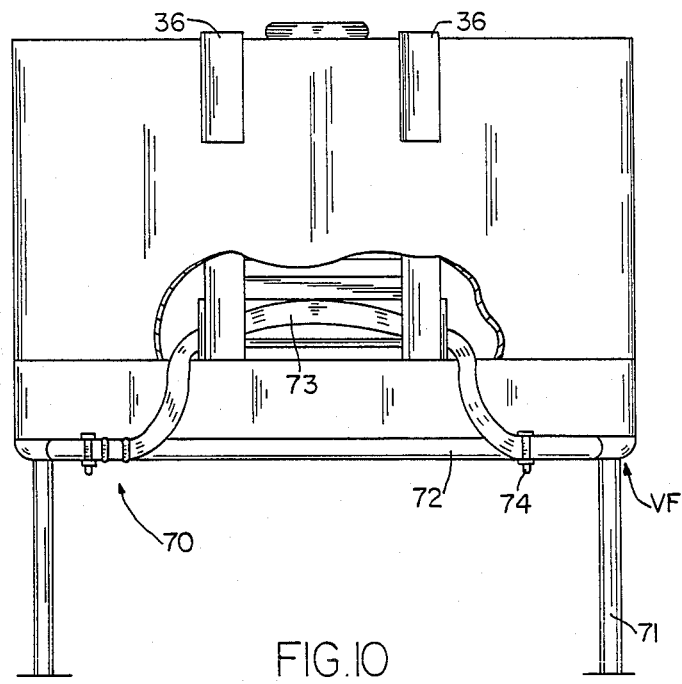
Figure 11:
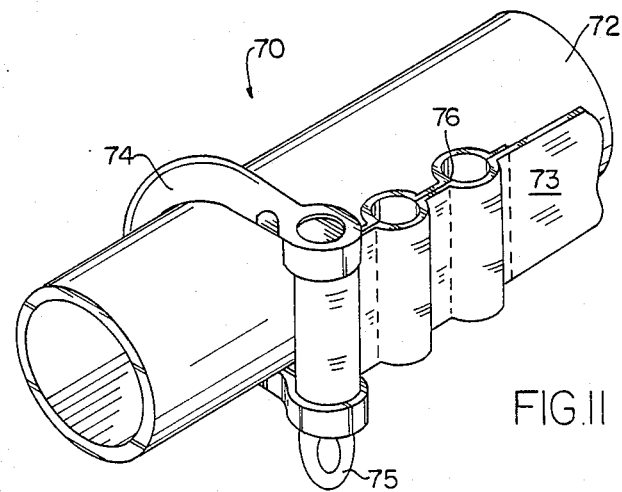

Looking again at FIGS. 9 and 10, the vehicle seat frame VF includes legs 71 which are attached to the vehicle floor, and crossbars 72 which extend front and rear of the vehicle seat (rear only shown in FIG. 9). The attachment means 70 comprises a strap 73 which is attached to both ends by U-bolts or anchor shackles 74 to the VF crossbar 72. The U-bolts 74 include removable pins 75 which extend through a loop or channel 76 on the ends of strap 73. One end includes a plurality of loops 76 (FIG. 11) so that the strap can be adjusted as necessary to tighten the seat 10 securely to the vehicle seat. The pin 75 of the U-bolt or anchor shackle is inserted through: one eye of the bolt, through the loop 76 and tightened into the second eye of the bolt to secure the strap. Removal of the seat only requires a simple removal of the pins from the U-bolt to release the strap.

Other and further modifications will become apparent to those skilled in the art by the invention which is limited only by the claims below.

What is claimed is:

1. A vehicle passenger safety seat for handicapped persons; said seat being of the type which can be detachably but securely mounted over an existing conventional van, bus, or other such vehicle seat, and comprising:

(a) a supporting frame having a vertical back member and a rigidly attached seat member, said back member further including a first retaining means associated with said back member for engagement over, across, and a prescribed distance downwardly behind the top of the vehicle seat to prevent said safety seat from tilting forwardly;

(b) said first retaining means comprising:
   (i) a first pair of retractable straps extending, one on either side, from the upper area of said back member; each of said straps including a clasp on the free end thereof;
   (ii) latch means secured to the floor of the vehicle at a position substantially in alignment with the rear of the mid portion of the vehicle seat, for receiving and locking said clasps therein;

(c) a second retaining means for further securing said safety seat in position on the frame of the vehicle seat; said first and second retaining means cooperating to prevent forward or backward tilting or lateral movement of said safety seat;

(d) a cushion member overlying said back and seat members;

(e) a pair of arms rests movably attached one on either side of said vertical back member for supporting the arms of the passenger;

(f) vertically adjustable foot support means mounted in the front of said seat member for supporting the feet of the passenger;

(g) said second retaining means comprising:
   (i) a second retractable strap extending from the rear face of said foot support means and including a clasp on the free end of said strap for engagement in said latch means;

(h) harness means for securing the passenger in said safety seat;

whereby said safety seat can be selectively positioned on the the seat of a van or bus, with said first retaining means over the top of the vehicle seat and said second retaining means securely fastened beneath the vehicle seat, for the safe transport of the handicapped passenger.

2. A safety seat according to claim 1 wherein said supporting frame comprises a unitary sheet of metallic material formed into the configuration including said seat and said back members.

3. A safety seat according to claim 1 wherein said supporting frame is constructed from a tubular aluminum material.

* * * * *